Sept. 17, 1946.  R. S. WILSON  2,407,859
MECHANICAL MOVEMENT
Filed April 3, 1945  2 Sheets-Sheet 2
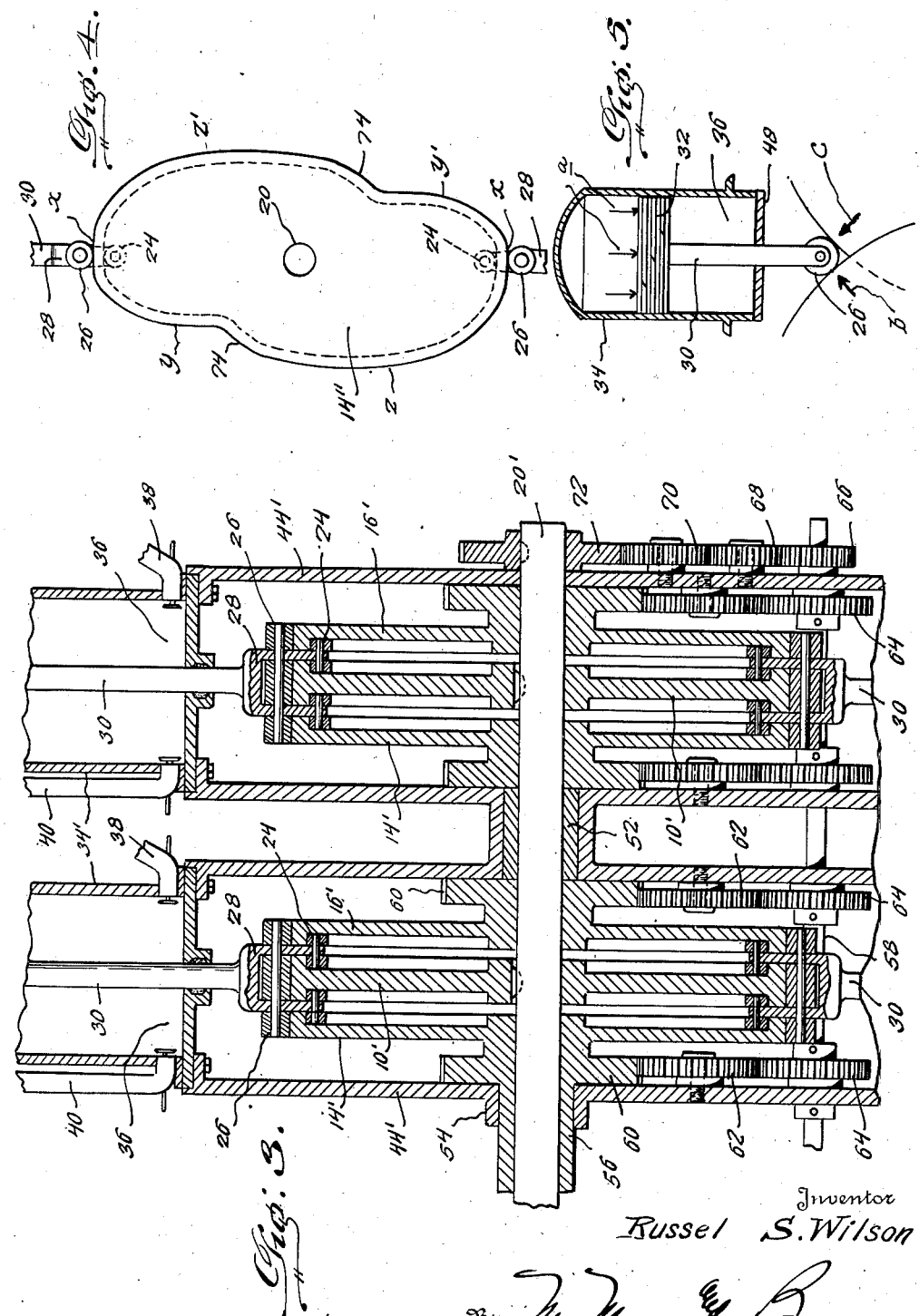
Inventor
Russel S. Wilson
By McMorrow and Berman
Attorneys Patented Sept. 17, 1946

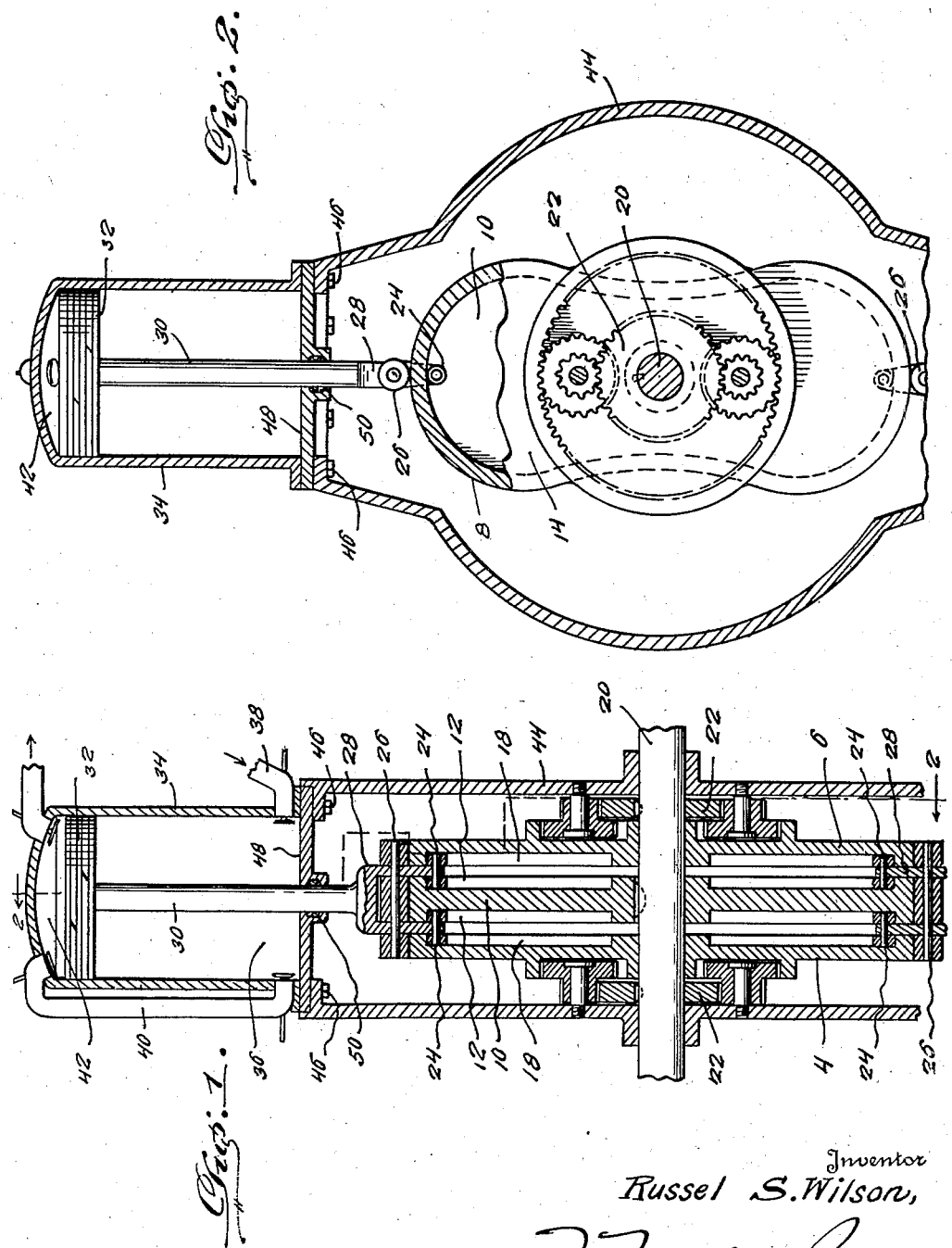

2,407,859

UNITED STATES PATENT OFFICE 2,407,859

MECHANICAL MOVEMENT

Russel S. Wilson, Filer, Idaho

Application April 3, 1945, Serial No. 586,338

5 Claims. (Cl. 74—55)

This invention appertains to a mechanical movement of a more or less general application to the translating of reciprocating motion into rotating motion or, contra, rotating motion into reciprocating motion.

The primary object of the invention is to provide a mechanical movement of this kind, wherein the moving parts thereof are so related that they operate with a precision of symmetry and balance as to be free from dynamic vibration and the forces translated by the same are likewise in perfect balance, in all directions and at all times.

Another object of the invention has to do with the provision of the above-mentioned mechanical movement which, basically, is comprised in three cams, having an equal even number of lobes each, with identical contours, and mounted to have rotary motion about a common center of rotation, the middle cam to have directional motion opposite to that of the outside cams and the three cams to be geared by a mechanical means to insure that angular displacement in the two directions of movement is equal at all times.

A further object of the invention lies in the adaptation of this counter-rotating cam mechanism for use in internal combustion engines of the diametrically opposed piston type, for translating the reciprocating motion of the pistons into rotary motion of a shaft, or shafts, so that, with the pistons operating in a timed sequence that the power strokes will be equal and opposite, the forces acting on the engine will be balanced, vibration practically eliminated, and a greater efficiency and smoothness in overall operation obtained.

Among the many other important advantages to be derived from an engine embodying this counter-rotating cam drive is: one, an inherent gear reduction, the ratio being determined by the number of lobes provided on the cam elements; two, the elimination of the usual cam gears and shafts for the actuation of the engine valves, the valve mechanism being here operated directly from the power shaft by reason of the aforesaid gear reduction; third, the elimination of main bearing pressure, except that incident to the weight of the parts of the drive mechanism, since all forces are equal and opposite on the rotating cams; fourth, the elimination of piston side thrust and, consequently, of friction loss and undue engine wear and, also, the use of wrist pins, since the movements of the piston and connecting rod is linear, allowing for shorter piston and cylinder construction, the use of a hollow connecting rod, and the adoption of salt cooling of the piston; and, fifth, no limit is placed on engine design or size and any type of piston travel can be obtained, such as constant acceleration and deceleration, harmonic motion, constant velocity, or any combination of these motions.

With these and other objects and advantages of equal importance in view, the invention resides in the certain new and useful combination, construction, and arrangement of parts, as will be hereinafter more fully described, set forth in the appended claims, and illustrated in the accompanying drawings, in which:

Figure 1 is a vertical, longitudinal section, through a form of two-cycle engine, in accordance with the invention;

Figure 2 is a vertical, transverse section;

Figure 3 is a sectional view similar to that of Figure 1, but showing a multi-cylinder engine construction;

Figure 4 is a side elevation of a modified form of cam element; and

Figure 5 is a vertical section through an engine cylinder and piston assembly, illustrating the balancing of the forces on the connecting rod, due to the opposite directional rotation of the cam elements, for the elimination of piston side thrust.

Referring in detail to the drawings, wherein like characters of reference denote corresponding parts in the several views, and more particularly to Figures 1 and 2, the invention, as it is exemplified therein, is comprised essentially in an assembly of three substantially identical cam elements 10, 14 and 16, arranged in juxtaposition on a drive shaft 20; the intermediate cam element 10 being keyed to the shaft and the outer cam elements 14 and 16 loosely mounted thereon but indirectly connected to the same by any suitable mechanical means, such as the planetary gearing 22, so that they rotate in the direction opposite to that of the intermediate cam element 10.

As shown, each of the cam elements 10, 14 and 16, is formed to provide two lobes in symmetrical arrangement, one hundred and eighty degrees apart; the intermediate cam element 10 also being formed with laterally extending flanges 12, at opposite sides of its edge portion, which are spacedly opposed to like flanges 18, formed on the inner sides only of the edge portions of the outer cam elements 14 and 16; the peripheries of these cam elements together constitute a trackway for a follower 24, preferably in the nature of an assembly of rollers having a common axial support, and the inner side surfaces of each pair of the complementally disposed flanges 12 and 18, a trackway for a follower 26, preferably in the nature of a somewhat similar assembly of rollers, also having a common axial support and of a lesser circumference than that of the rollers 24.

These roller assemblies are mounted on a fork or yoke 28, formed at one end of a reciprocating element 30, which may take the form of the connecting rod of a cylinder and piston assembly of an internal combustion engine or the like; the supporting axle or shaft of the rollers 24 being journalled in the arms of the fork or yoke, adjacent the connected ends thereof, and the supporting axle or shaft of the rollers 26 in proximity to the outer ends of the arms, the latter extending inwardly of the spaces provided between the opposed pairs of the flanges 12 and 18, substantially as shown.

In adapting this counter-rotating cam drive to use in the design and construction of an internal combustion engine, in accordance with the invention and as shown in Figures 1 and 2, it will be evident that each of the connecting rods 30 and their pistons 32 may be rigidly connected, or made integral, since the movement of the same is linear, and, also, that the connecting rods may be made from tubular stock, which is stronger per weight than conventional types. Again, with the driving force of each of the pistons, diametrically opposite, divided to rotate the intermediate cam element 10 in a direction opposite to that of the cam elements 14 and 16, side thrust on the pistons and their rings, and the usual friction loss and engine wear otherwise present, is eliminated; allowing for the use of pistons and cylinders of shorter length. Thus, since all forces are equal and opposite on the rotating cams, the bearings supporting these elements and the power shaft 20 has to withstand only the weight of the same as bearing forces or pressures, and the direct connection of the pistons with the connecting rods readily permits of the adoption of salt cooling of the pistons, in a manner similar to that employed in the "sodium cooled" exhaust valves of modern aircraft engines. By reference to Figure 5, the linear movement of a piston 32 and its connecting rod 30 is indicated by the arrows a, while the balanced forces, acting on the same, are indicated by the arrows b and c.

In this two-cycle type of engine construction, an increased volumetric efficiency is to be obtained, through the use of the space 36, within each cylinder 34 and below the piston 32, as a compression chamber, for fuel charges admitted to the chamber at the intake 38; a fuel charge, during and following compression, being forced, by way of the conduit 40, into the firing chamber 42, above the piston. If a similar type of set-up is used with a four-cycle engine, using a storage chamber (not shown), a supercharger effect would be obtained, as two pumping strokes of the piston would occur for each intake of fuel charge into the combustion chamber 42. Also, an engine equipped with this cam drive will have an inherent gear reduction principle, since, for each complete cycle of piston operation, the two lobe cams 10, 14, and 16, turn through an angular distance of but one hundred and eighty degrees, giving a two-to-one ratio. Using a four lobe cam, with the lobes ninety degrees apart, the gear reduction ration will of course be four-to-one. This is a very desirable characteristic for aircraft engines, where the propeller R. P. M., must be low, and vibration of a high speed internal mass becomes a problem. The cam mechanism or unit is enclosed within the engine crank-case 44, to which, each of the oppositely disposed cylinders 34 is bolted, as at 46; the attached end of each of the latter being closed off from the interior of the crank-case by an end plate 48; a packing gland 50 being carried by the end plate and engaged about the connecting rod 30.

In the double opposed type of engine, as shown in Figure 3, a cam mechanism or unit is provided for each set of opposed piston and cylinder assemblies, substantially as illustrated for the purposes of this description. The cam units may be housed within individual crank-cases 44', which are interconnected at their adjacent sides by a bearing support 52, for the main drive shaft 20', which also has support in the outer side walls, as at 54. Here, the intermediate cam elements 10', of each cam unit, is keyed to the shaft 20', while the other cam elements 14' and 16' are loosely mounted thereon, as in the first instance. The outer cam element 14', of an end unit, is carried by a tubular shaft 56, mounted on the complemental end of the main shaft 20', while each of the outer cam elements 14' and 16', of both units, is connected with a counter-shaft 58, by a train of intermeshing gears 60, 62, and 64; the gear 60 being secured on the cam hub, the gear 62 journalled in the adjacent wall of a crank-case 44', and the gear 64 keyed on the counter-shaft, which, in turn, is journalled in suitable bearings carried by the opposed walls of the crank-case sections. For the purpose of insuring of the desired equal and opposite angular displacement between the counter-rotating parts of the drive mechanism assembly, the counter-shaft 58 is connected with the main drive shaft 20', by a train of gears 66, 68, 70 and 72; the gear 66 being keyed on the counter-shaft and the gear 72 on the main drive shaft 20', while the intermediate gears 68 and 70 have suitable bearing in the adjacent wall of a crank-case 44'.

As before stated, any type of piston travel can be had to meet engine design or operation requirements, the time division of the piston strokes being one of choice and a matter of cam lobe contour. In the cam formation shown in Figures 1 through 3, the reversed directional strokes of the piston 32 are of equal duration, due to the symmetry of the lobe contour. However, it may be desired, on the one hand, to have the power stroke of a piston of a longer duration than that of its return stroke, in order to obtain greater power overlap or, on the other hand, to have the power stroke of a shorter duration than that of the return stroke, to obtain a quicker expansion of the combustion charge and a lessened heat loss to the engine. This variation between the power and return strokes of a set of opposed pistons is to be effected by the modified form of cam element 12'', illustrated in Figure 4, wherein, with the power strokes of the pistons applied to the high points x on the lobe contours, which points lie in the plane of the longer axis of the cam body, and the direction of rotation of the cam, for instance, clockwise, the duration of the power strokes of the pistons will be shorter than that of the return strokes thereof, since the effective portion y of the cam contour, at the moment, is shorter than that of the succeeding portion z, to become effective during the return strokes. Contra, with the cam element set for anti-clockwise rotation, the duration of the power strokes of the pistons will be longer than that of their return strokes, since the now initially effective portion $z'$ of the cam contour is longer than the length of the succeeding portion $y'$. Dwells 74 may be provided at the points of division between the opposite legs of the two lobe contours, to provide a time delay in the reversing of the power and return strokes of the pistons, to allow exhaust gases to escape, or for combustion pressures to reach a desired value before the power strokes begin.

With reference to Figure 3, the bearing element 52 may take the form of a direct connection between the adjacent cam elements 16' and 14', of the two cam assemblies shown therein, in which case, one of the inner of the gear trains, constituted in a set of the gears 60, 62 and 64, associated therewith, can be eliminated. Also, the tubular shaft 56, carrying the outer cam element 14', of the left hand cam assembly, may be employed as a power take-off; it having rotary motion counter to that of the main power shaft 20' and, when so employed, its torque balances out that of the latter and, thus, the engine is relieved of the effects of these forces.

Without further description, it will be evident that an engine or the like, constructed in this manner, is not limited in design, or in size. As a flat opposed engine, as many cylinder and piston assemblies as desired can be employed, the piston assemblies operating in opposed pairs with each counter-rotating cam mechanism. In a radial engine, either the same number of cylinders, or twice the number, would be required as there are lobes on the cams, and as many banks of cylinder and piston assemblies, as desired, can be built into an engine or like machine. Also, it is thought to be obvious that the counter-rotating cam mechanism is readily adaptable to a more general use, wherever the conversion of reciprocating motion into rotary motion, or vice versa, is involved and, further, that the shape of the cam contours is unlimited and, therefore, capable of variation to meet any desired type of piston travel.

What I claim is:

1. A mechanical movement for converting reciprocating motion into rotary motion, or vice versa, comprising opposed reciprocating members, a rotary shaft, cams carried on said shaft, and followers carried by said reciprocating members and engaged with said cams, one of said cams being directly connected with said shaft and the others indirectly connected therewith for the rotation of said one cam in a direction counter to that of said other cams, so that the angular displacement of the cams is equal in both directions of rotation at all times and the forces of the reciprocating members are in balance, said cams being three in number for each set of opposed reciprocating members and having identical outer and inner contours engaged by said followers.

2. A mechanical movement for converting reciprocating motion into rotary motion, or vice versa, comprising opposed reciprocating members, a rotary shaft, cams carried on said shaft, and followers carried by said reciprocating members and engaged with said cams, one of said cams being directly connected with said shaft and the others indirectly connected therewith for the rotation of said one cam in a direction counter to that of said other cams, so that the angular displacement of the cams is equal in both directions of rotation at all times and the forces of the reciprocating members are in balance, said cams being three in number for each set of opposed reciprocating members and having identical outer and inner contours, said cams being juxtapositioned on said shaft to have the outer contours thereof jointly contacted by one follower on each of said reciprocating members and the inner contours of each two adjacent of the same separately contacted by the other followers on each of the reciprocating members.

3. A mechanical movement for converting reciprocating motion into rotary motion, or vice versa, comprising opposed reciprocating members, a rotary shaft, cams carried on said shaft, and followers carried by said reciprocating members and engaged with said cams, one of said cams being directly connected with said shaft and the others indirectly connected therewith for the rotation of said one cam in a direction counter to that of said other cams, so that the angular displacement of the cams is equal in both directions of rotation at all times and the forces of the reciprocating members are in balance, said cams being three in number for each set of opposed reciprocating members and arranged in closely spaced relation on said shaft, the intermediate cam being keyed to said shaft and the others geared thereto.

4. A mechanical movement for converting reciprocating motion into rotary motion, or vice versa, comprising opposed reciprocating members, a rotary shaft, cams carried on said shaft, and followers carried by said reciprocating members and engaged with said cams, one of said cams being directly connected with said shaft and the others indirectly connected therewith for the rotation of said one cam in a direction counter to that of said other cams, so that the angular displacement of the cams is equal in both directions of rotation at all times and the forces of the reciprocating members are in balance, said cams being three in number for each set of opposed reciprocating members and arranged in closely spaced relation on said shaft, said cams having opposed lateral flanges conforming to their peripheral contours, the peripheral contours of said cams being jointly engaged by one of the followers on each of said reciprocating members and the like contours of the inner sides of each pair of the opposed of said flanges separately engaged by the other of said followers.

5. A mechanical movement for converting reciprocating motion into rotary motion, or vice versa, comprising opposed reciprocating members, a rotary shaft, cams carried on said shaft, and followers carried by said reciprocating members and engaged with said cams, one of said cams being directly connected with said shaft and the others indirectly connected therewith for the rotation of said one cam in a direction counter to that of said other cams, so that the angular displacement of the cams is equal in both directions of rotation at all times and the forces of the reciprocating members are in balance, said cams being three in number and juxtapositioned on said rotary shaft, with the intermediate of the cams keyed on the rotary shaft, and a tubular shaft mounted on said rotary shaft for independent rotary motion relatively thereto and in connection with one of the outer of the cams, said shafts being rotatable in opposite directions whereby the torque of one balances out that of the other.

RUSSEL S. WILSON.